United States Patent [19]

Nakagawa et al.

[11] Patent Number: 4,531,705
[45] Date of Patent: Jul. 30, 1985

[54] COMPOSITE AND DURABLE FORMING MODEL WITH PERMEABILITY

[75] Inventors: Takeo Nakagawa, Kanagawa; Hiroyuki Noguchi, Tokyo; Akira Yanagisawa, Miyashiro; Toyoji Fuma, Toyokawa; Masanobu Tsuchida, Okazaki; Takehiro Inagaki; Yoshikazu Hayashi, both of Toyokawa, all of Japan

[73] Assignee: Sinto Kogio, Ltd., Nagoya, Japan

[21] Appl. No.: 597,524

[22] Filed: Apr. 6, 1984

[30] Foreign Application Priority Data

Apr. 22, 1983 [JP] Japan ................. 58-71259

[51] Int. Cl.³ .............. B29C 17/00; B29C 1/00
[52] U.S. Cl. ............... 249/134; 425/405 R; 249/141; 249/62
[58] Field of Search ......... 249/78, 79, 80, 82, 249/134, 141; 425/405 R, DIG. 29

[56] References Cited

U.S. PATENT DOCUMENTS

| 2,841,823 | 7/1958 | Van Hartesveldt | 425/405 R |
| 2,907,070 | 10/1959 | Van Hartesveldt | 249/80 X |
| 3,353,219 | 11/1967 | Snyder | 425/405 R |
| 3,723,584 | 3/1973 | Nussbaum | 249/134 X |
| 3,932,096 | 1/1976 | Kartman | 249/79 X |
| 4,125,351 | 11/1978 | Alfter et al. | 425/405 R X |
| 4,307,867 | 12/1981 | Shannon | 249/134 |
| 4,380,421 | 4/1983 | Morris | 249/134 X |
| 4,425,411 | 1/1984 | Textor et al | 249/134 X |

Primary Examiner—J. Howard Flint, Jr.

[57] ABSTRACT

Proposed models are used for forming into destined shapes liquid, slurry, soft, sheet or lump materials, and are provided with endurance for many times of use and excellent permeability. A basic feature is that aggregates are ferrous or non-ferrous metallic grains and ceramic grains, to which a binder contained in evaporating or consumable substance is added and kneaded, and sintered. The mode has a close hardened layer scattered with metallic oxides on at least a shell. The hardened layer has fine air vents in its thickness. The whole body of a model is 5 to 60% of porosity and more than 100 Kg/cm² of compression strength.

14 Claims, 43 Drawing Figures

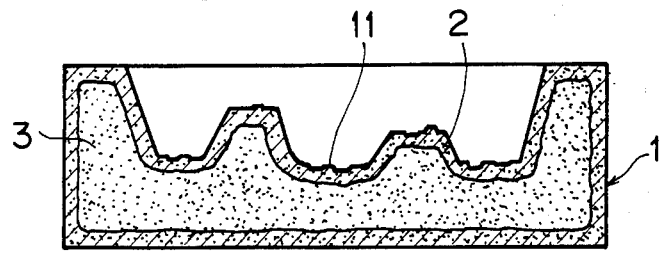
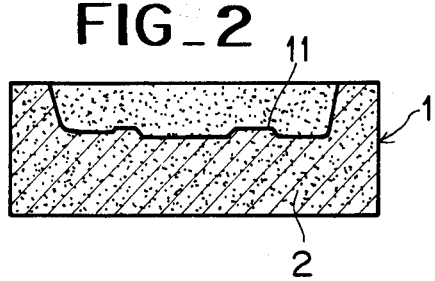
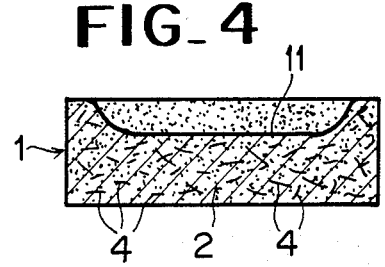
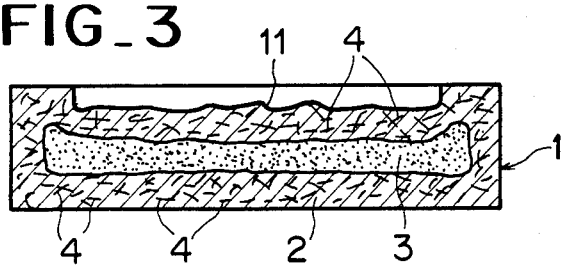
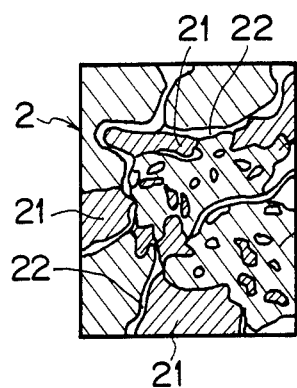
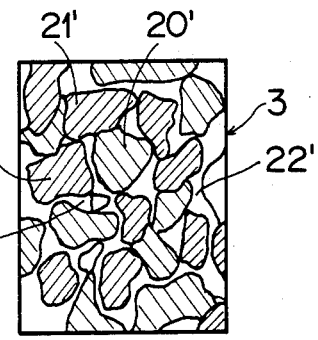

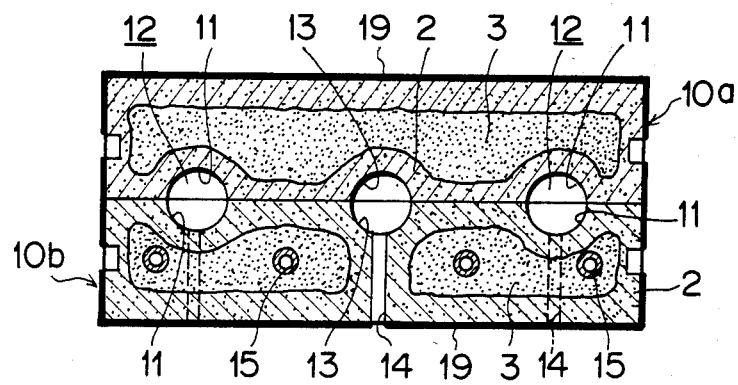
FIG_6
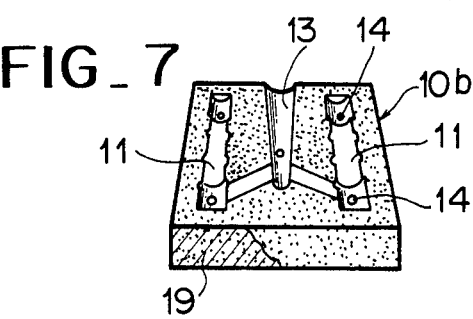
FIG_7
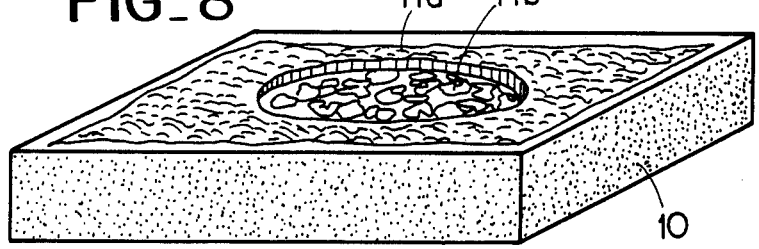
FIG_8
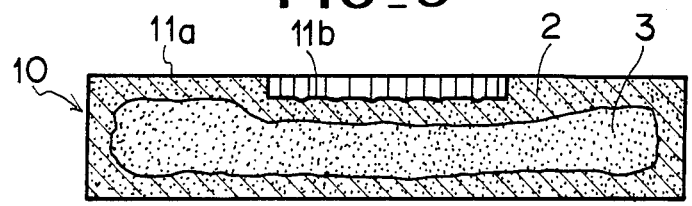
FIG_9

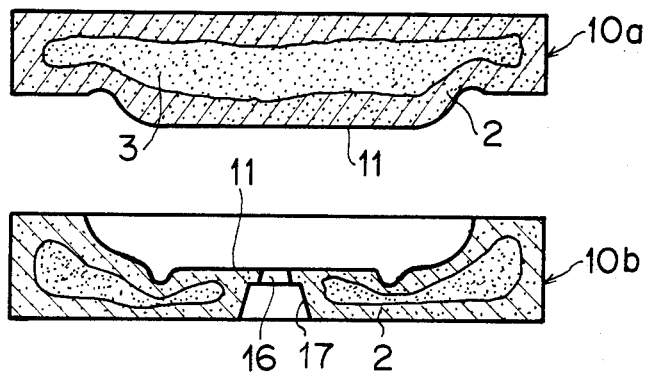
FIG_10
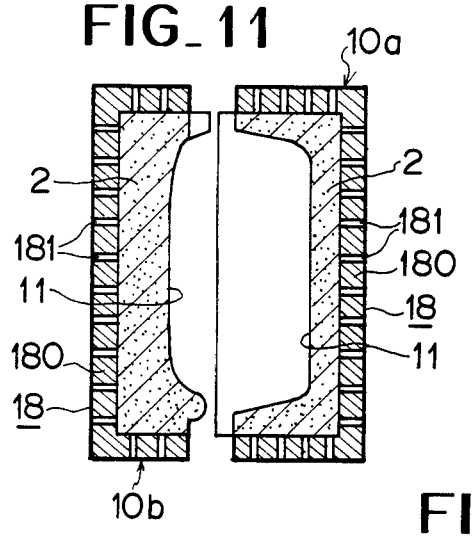
FIG_11
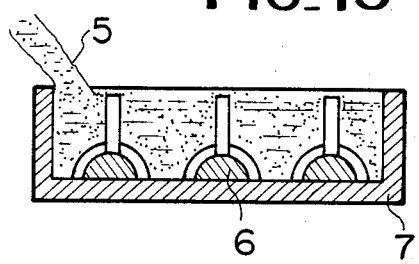
FIG_13
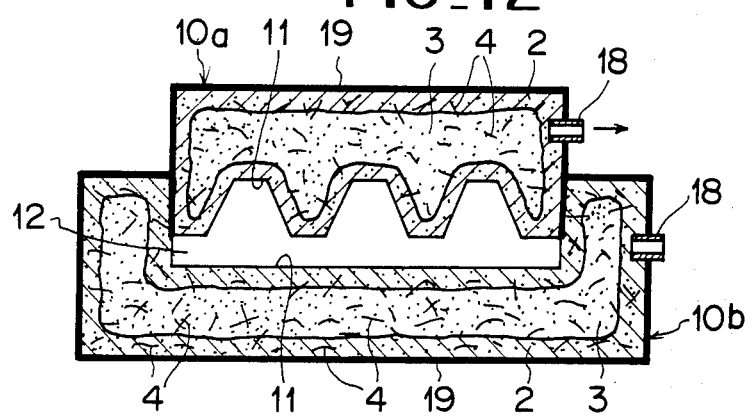
FIG_12

FIG_14
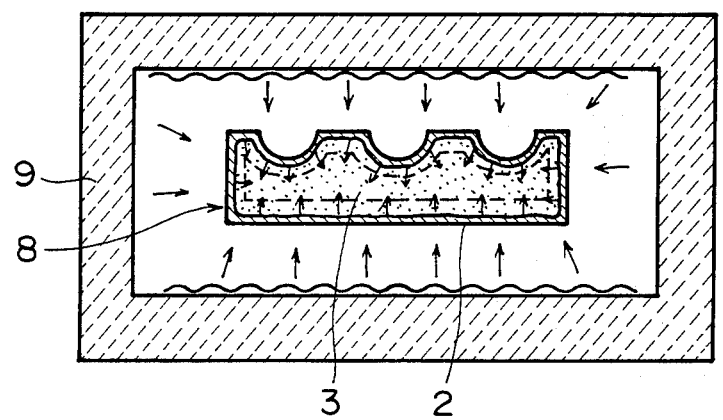
FIG_15(a)
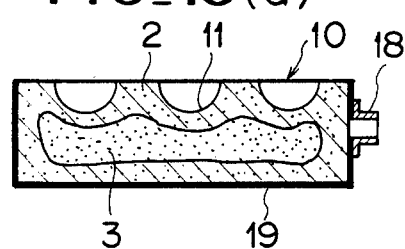
FIG_15(b)
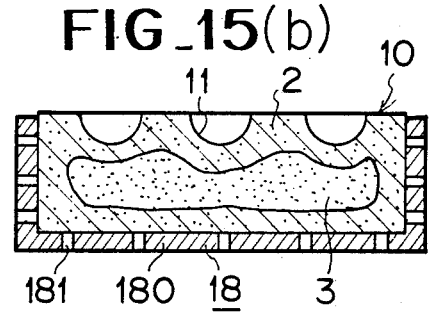
FIG_16
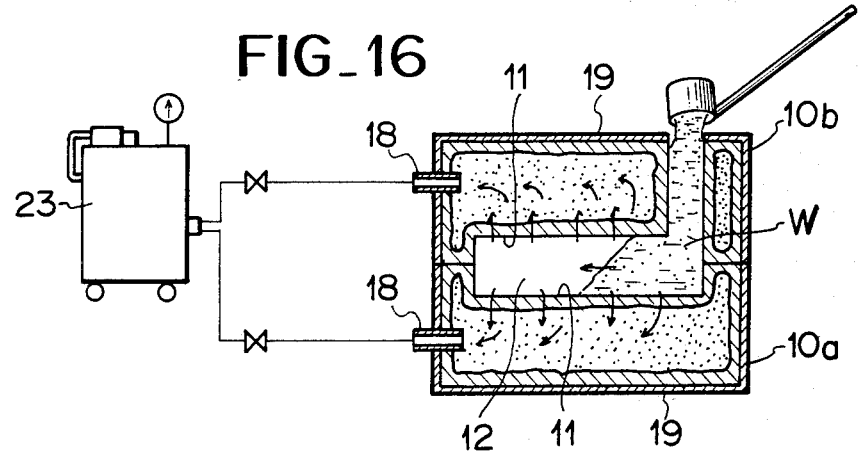

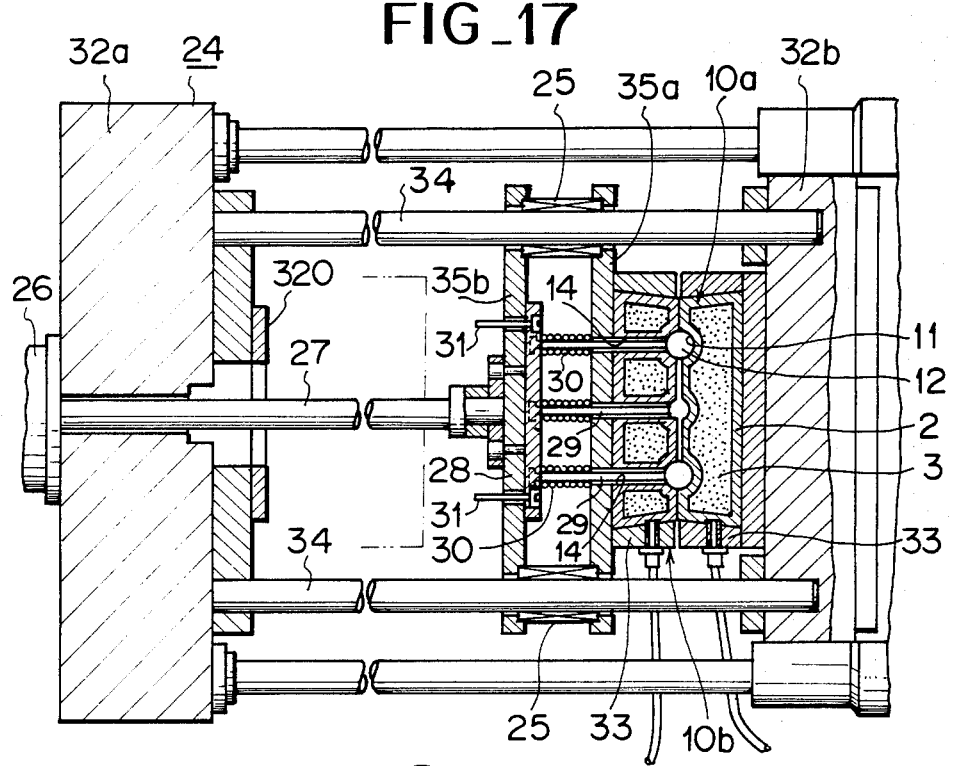
FIG_17
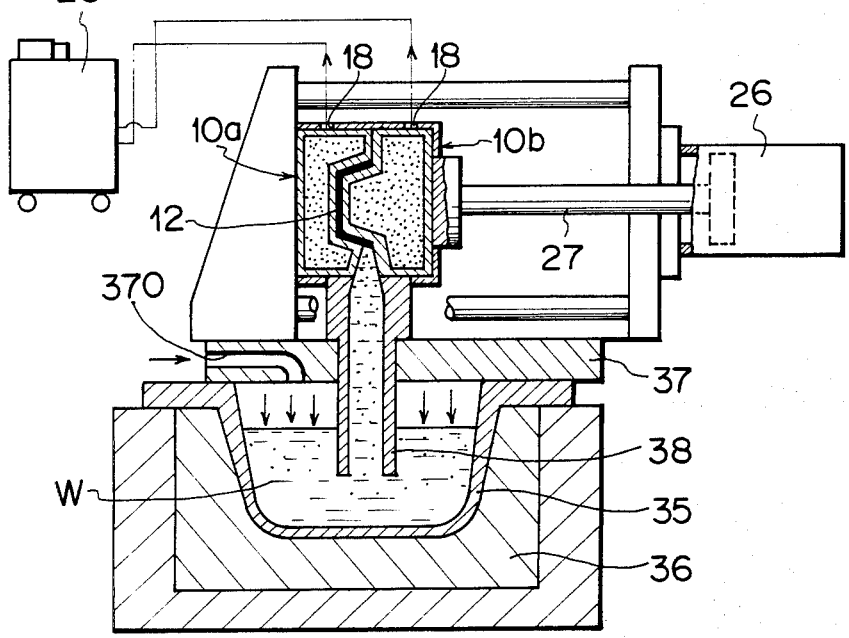
FIG_18

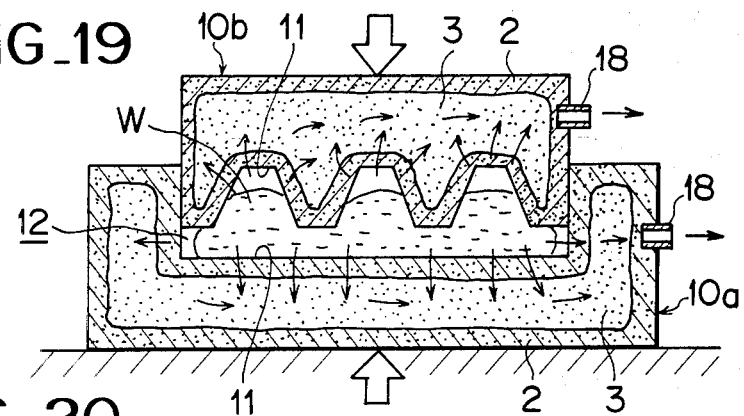
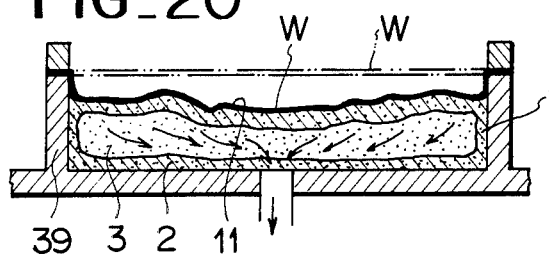
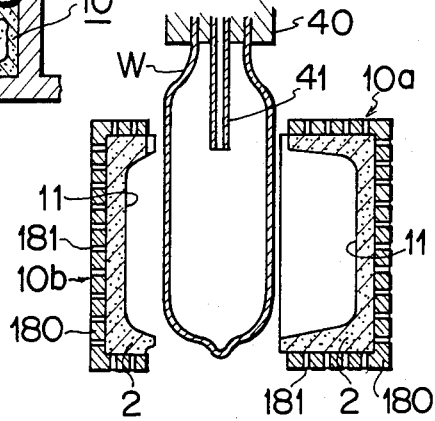
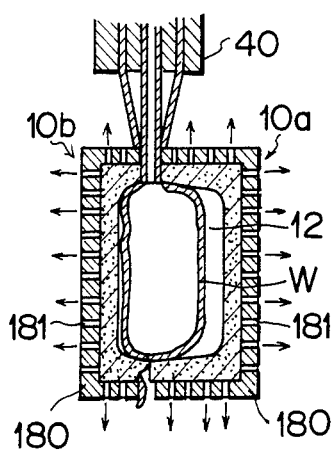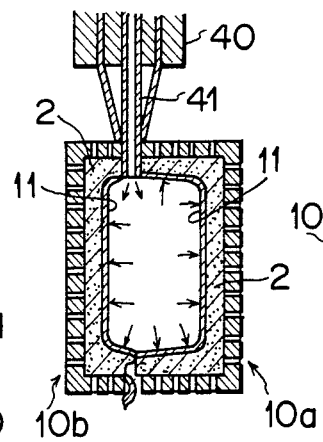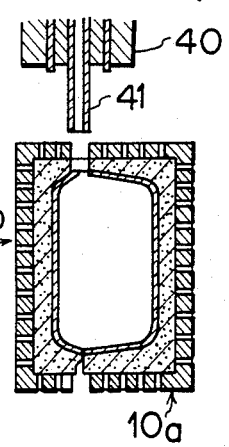

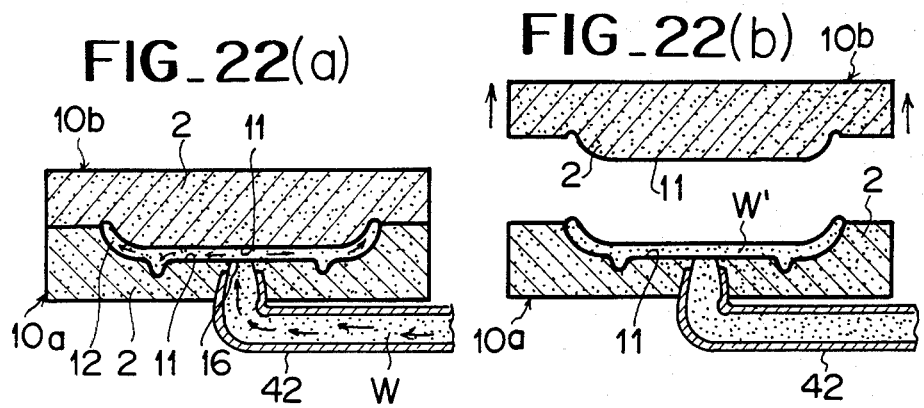
FIG_22(a)
FIG_22(b)
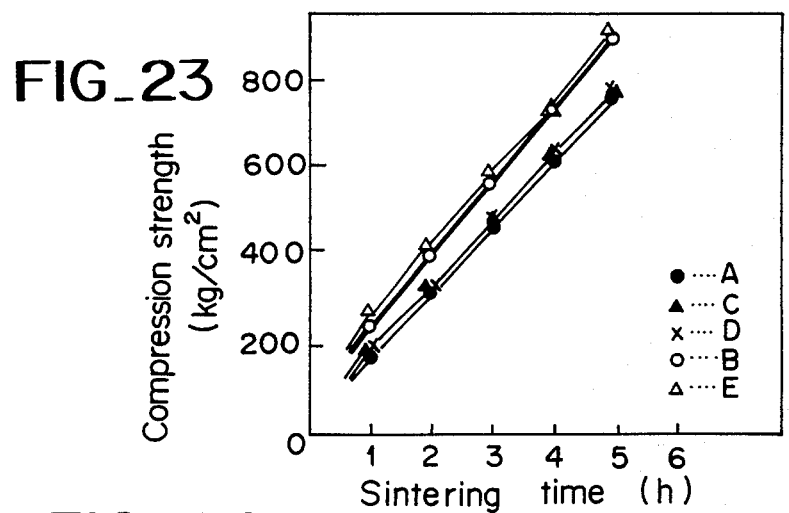
FIG_23
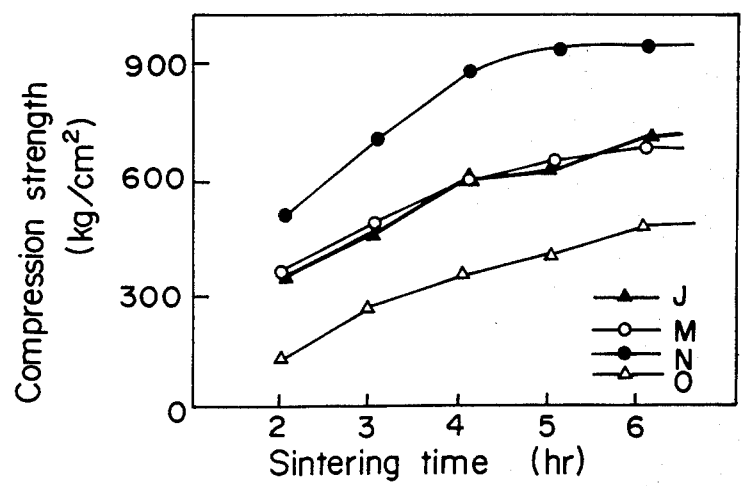
FIG_24

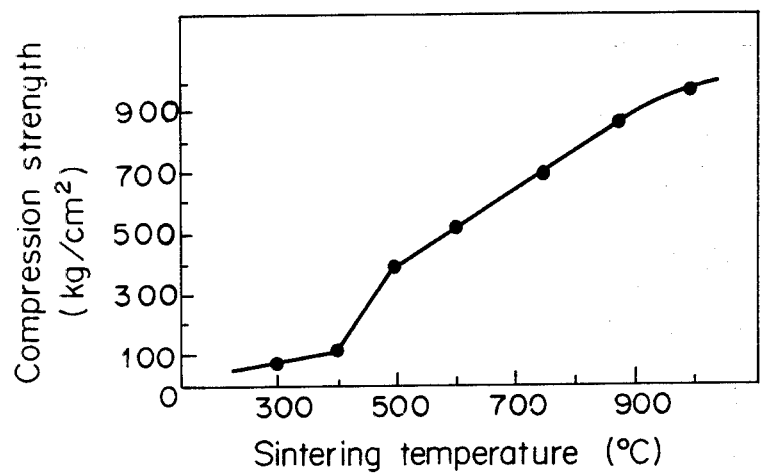
FIG_25
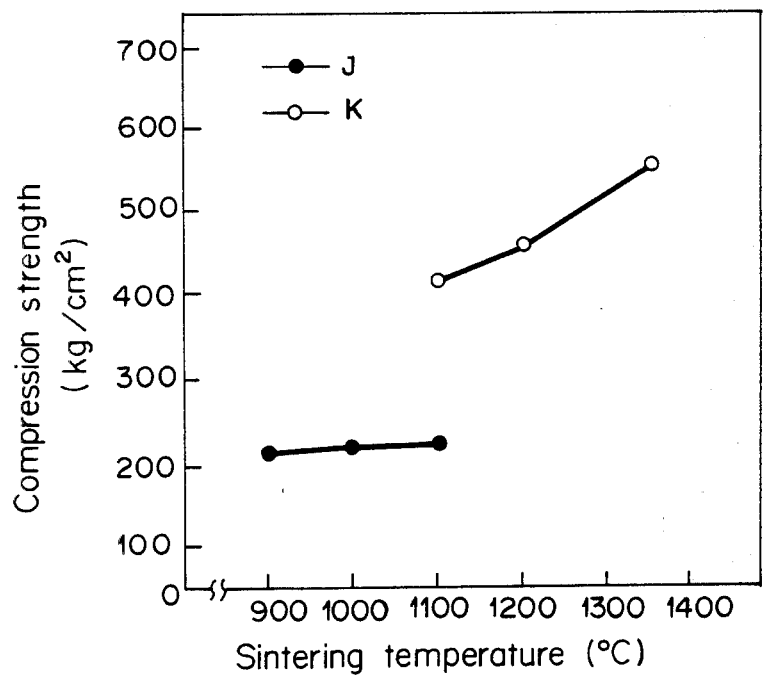
FIG_26

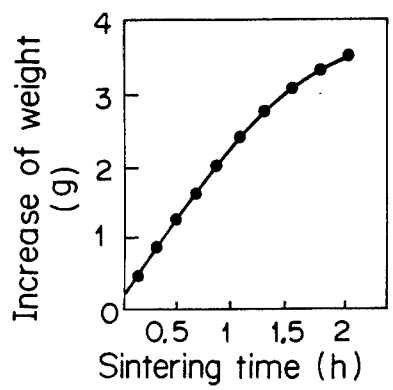
FIG_27
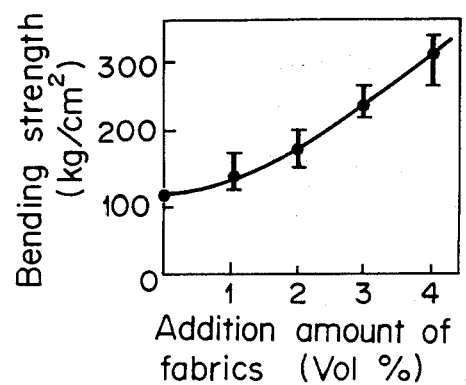
FIG_28
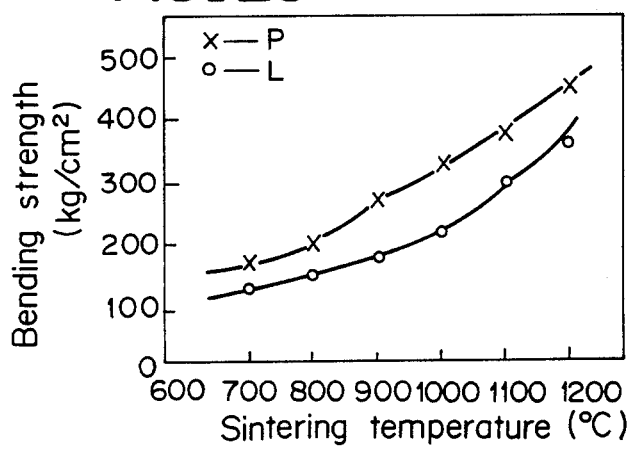
FIG_29
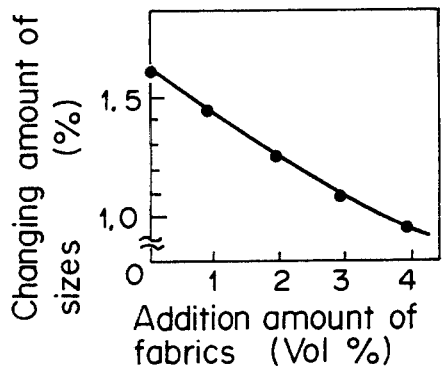
FIG_30
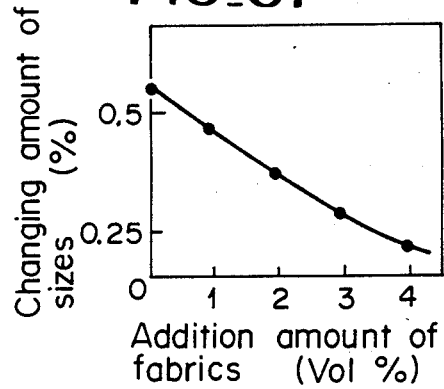
FIG_31

FIG_35
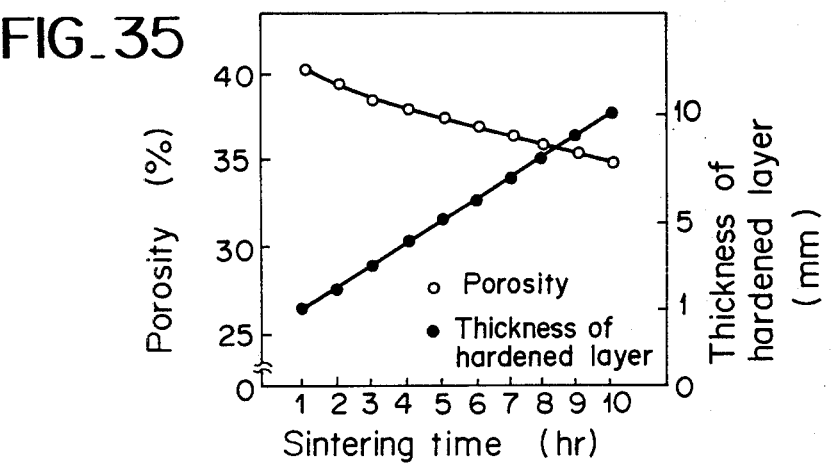
FIG_36
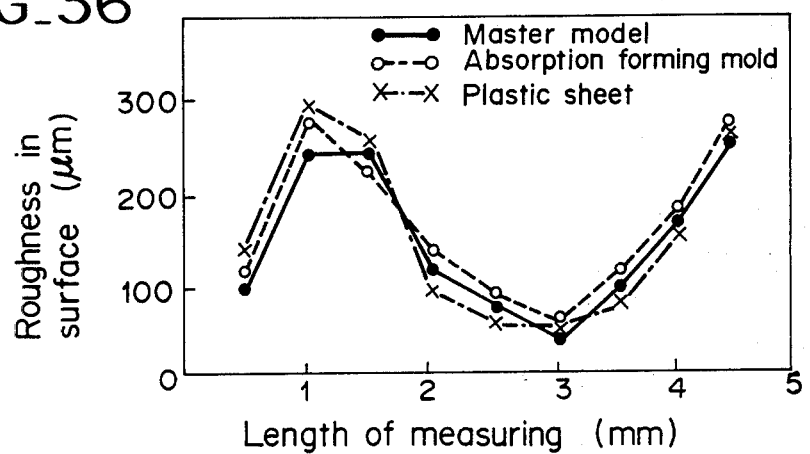
FIG_37
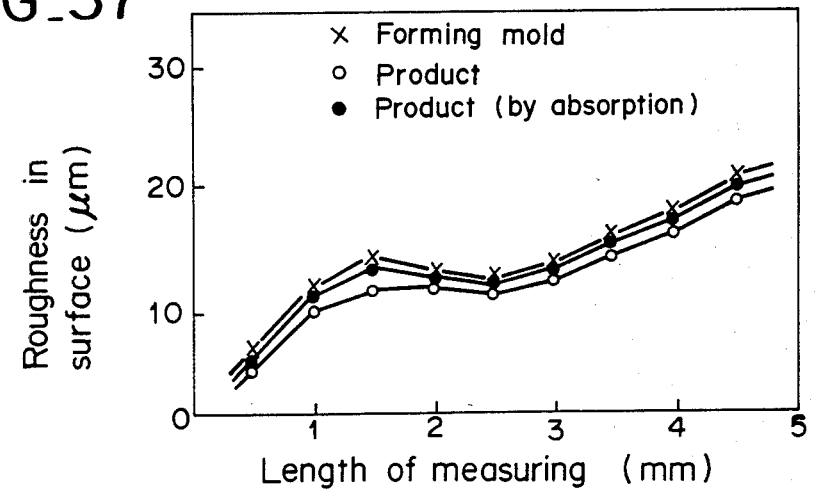

COMPOSITE AND DURABLE FORMING MODEL WITH PERMEABILITY

BRIEF DESCRIPTION OF THE INVENTION

This invention relates to a forming model, especially to a forming model having desired permeability and endurance.

For manufacturing destined products of three dimensional shapes or semi-products of metals, plastics, ceramics, rubbers, glasses or their composites, it has been widely practiced to put liquid, slurry or softened materials into a model having a cavity, and subject it to pressure or non-pressure, or reduced pressure.

It is desirable that the above mentioned forming models satisfy the under mentioned requirements.

(1) The model is provided with strength characteristic to required forms and is well durable to various uses.

(2) The model is provided with desirable translation property and may produce complicated shapes of thin thickness.

(3) The cavity thereof is effective in removing the air, gas, water and others, so that neither the surface nor the interior of the product are created with pin holes or porosities or formed with uneven thickness.

(4) The model is easily made large for larger sized products.

(5) The production thereof is easy and economical.

Unfortunately, there has never been a practical model which may meet all of these requirements.

For example, a metal cast is used as a durable type for forming (casting) molten metal such as aluminium alloy, as seen in a die cast. The metal cast may satisfy the requirements (1) and (2), but could not satisfy the requirements (3), (4) and (5). Especially, the die casting process pours the molten metal into the cavity under pressure and at high speed, and easily makes porosities due to no permeability. Therefore problems arise when the products require air tightness or when heating treatment or surface treatment are performed after casting.

A durable mold for producing cubic articles of plaster or rubber is prepared with a metal cast which in general makes a pair with a stationary side and a movable side, into which liquid or softened material is poured and to which determined pressure is applied by means of the metal cast itself or said fluid. However, also in this case, since the air within the cavity or the air involved in the raw material could not be expelled, the condition (3) would be hardly expected, so that there arise problems that the articles of high qualities are decreased in yielding, or it takes much time for removing burrs created by applying the high load. Thus, the conditions (4) and (5) could not be satisfied.

With respect to the forming process of plastics, there are some molds of low forming load, and a typical one is a vacuum forming process. This vacuum process comprises, as known, fixing a sheet like plastic of thermal plasticity to a frame, heating to soften the plastic sheet under such condition, absorbing the air staying in the frame via the mold positioned under the frame, and adhering the plastic sheet to the surface of the mold. Recently, rugged patterns called as "leather embossing" have been practiced on the surface of the product for heightening the product value, and the leather embossing has become more and more complicated.

The vacuum forming die is conventionally represented by wooden, plaster, resin or metal molds. The wooden mold is easily deformed or cracked by repetition of rapid heating and rapid cooling. The plaster mold is weak in strength and rough on the surface and easy in wearing, while its surface becomes burnt plaster and delaminated. The resin type is also weak in strength and heat resistance, and, in addition, more expensive than the former two, taking much time for production. Therefore they could not satisfy all of the conditions (1) to (5) concurrently, and are not suitable for mass-production.

In view of such circumstances, the metal cast is in general employed as the model for mass-production. The metal cast is excellent in endurance, precision, accuracy and so on, and it could respond to the conditions (1) and (2) but the metal cast has a problem in difficulty to form vents important to the absorbing type similarly to the wooden, plaster and resin types.

To state it in detail, since the vent of the vacuum forming die is prepared by a ball disc or drill, the vent diameter or pitch of the vent are limited, so that the vent could not respond when concaves and convexes are many as with leather embossing, or when the thickness of sheet is thin and the absorbing vents be small correspondingly. Therefore, the absorbing ability to the plastic sheet, in other words, the adhesion of the sheet, is decreased easily causing disorder of drawing on the surface, unevenness of thickness, wrinkles at the corner portions or other problems due to irregularity of the absorption. The metal cast of this type of the forming process depends upon an electric casting process which requires high technical skill, and takes much time, and it could not meet the conditions (4) and (5).

As a mold for forming ceramics such as earthenware, the plaster mold is generally used. Water in the mixture of ceramics in slurry (called "slip") is absorbed via porosities of the plaster.

However, the plaster is inferior in strength and wear resistance as mentioned above, and is cracked at the corner portions in a short period of time. Further the plaster is easy to take chemical reaction with the slip. Endurance is low, and the use limit is several hundred times, and it is difficult to perform forcible absorption because of the low endurance. Besides, the surface is rough and the finished products are not easily made attractive.

Due to the low strength, it is difficult to make the mold large, and products of large sizes could not be made. If the water absorbed mold were dried at high temperatures, burnt plaster would result, and delamination or exfoliation would be caused. The drying should be carried out at low temperatures with much time, thereby causing the manufacturing cycle of the ceramic products to be lowered. Thus, all the conditions could not be met.

From the above viewpoint, it may be said in stereotype that molds with permeability are poor in endurance, and molds with endurance, such as the metal cast are inferior in permeability.

SUMMARY OF THE INVENTION

The present invention is to provide a new and practical forming model in which the above mentioned requirements are all satisfied and the inconveniences involved about the conventional products are removed.

It is a first object of the invention to provide a durable forming model with permeability which is imparted with satisfactory strength, wear resistance, endurance for using for a repetition of many times, and in addition, desirable permeability all over the model surface without having performed any special permeable process. Therefore, the air, gas, water and others in the cavity and the forming material may be removed effectively, and sheet like forming material adhered air tight to the model surface. The model is smooth and elaborate in spite of the permeability all over the surface, and it is well conditioned in the translation property so that it is possible to manufacture products of complicated shape and thin thickness by an easy process and at low cost.

It is a second object of the invention to provide a permeable and durable model, in addition to the first object, which is excellent in chemical stability, such as heat resistance or corrosion resistance, and which is especially suitable for the forming of ceramics, plastics or the like.

It is a third object of the invention to provide a permeable and durable model which is high in mechanical strength, especially bending strength, and satisfactory in dimensional stability.

For accomplishing the above mentioned objects, the invention proposes a composite sintered product, especially structure of the composite sintered product, where metal powders and ceramic powders are aggregates to which a bond containing evaporable substance is added and burnt.

The composite sintered product is made by pouring a slurry material, where the bond containing the evaporable or inflammable substances is mixed with the aggregates at specific weight ratio, into a frame which is arranged with a product sample or a finished model, molding and shaping said material, drying it and sintering the dried substance in the oxidizing atmosphere. It is a proper condition that the weight ratio of the metal powders: ceramic powders: binder = (1-5):(1-5):1.

In the composite sintered product, a whole body including a central thick part may be a hardened close layer which is scattered with metallic oxides, otherwise the hardened layer is a shell of a certain thickness over the outer surface, whereby an internal part may be a backing layer composed of a non sintered mixture which is scattered with metallic oxides.

The composite sintered product is porous. That is, the vaporous of inflammable substance in the binder passes through the hardened layer and backing layer, and gets out from the surface of the model, so that fine open pores of micron size are formed countlessly. The entire model is provided with porosity of at least 5% by said open pores, and the model has compression strength of more than 100 Kg/cm$^2$ by the shell effect of the hardened layer.

Said metallic powders are ferrous powders or non ferrous powders. For the former, cast iron powder, pure iron powder, electrolytic powder or steel powder are selected, and for the latter, one or more are selected from Ni powder, Cr powder, Mn powder, Mo powder, Ti powder Cu powder, Co powder or W powder. Each of them is sintered under a condition of mixture with ceramic powder, and the hardened layer is formed in that binding like diffusion combination takes place at interface between the metallic powders and ceramic powders.

For a forming model according to the invention it is further characterized in that a body thereof is a composite sintered substance of metallic powders, ceramic powders and reinforcing fibers. The composite sintered substance includes the hardened layer and also, if any, non-sintered mixture in the inner side of the hardened layer, and the ceramics are scattered with the metallic oxides and the reinforcing fibers. The strength of the model is improved by bridging action of the reinforcing fibers and the model is checked from deformation.

The reinforcing fiber is added not more than 20 vol% for the mixture of the binder including the metallic powders, the ceramic powders and the binder including evaporable or inflammable subtances. The other structure is the same as the basic invention mentioned above.

"Forming model" referred to in the present invention includes all models which have cavities for forming determined shapes.

There is a casting by reduction pressure (non pressure-absorption forming model) which pours into the cavity under gravity, i.e., non pressure on the liquid material which is represented by molten glass, molten plastic or molten metals such as Al or its alloy, Zn or its alloy, Mg or its alloy, Cu or its alloy, normal cast iron, ductile cast iron, and forms the material by acting the external absorbing force thereon, or there is another casting (pressure-absorption forming model) which pours the above liquid material into the cavity under pressure, and form it by acting the external absorbing force thereon.

There is a further forming which puts a softened lump material such as rubber, glass, plastic metal or the like into the model and carries out pressure in accompany with plastic flow, while forming the material by acting the external absorbing force.

Furthermore, the invention is used as a model which, as represented by the vacuum forming of plastics, acts absorbing force on softened sheet material for undertaking translation of patterns carved on the model surface, otherwise it is used as a model which, as represented by blow forming of plastics, subjects inner pressure to a bag like sheet until expansion to press the plastic to the model surface. In addition, it is used as a model which absorbs water from the slurry material (slip) poured in the cavity when the ceramic products are obtained as mortar, refractory or earthenware.

Many other features of the invention will be apparent from the following description of the invention.

BRIEF DESCRIPTION OF THE INVENTION

FIGS. 1 and 2 are cross sectional views showing a basic embodiment of the invention, FIGS. 3 and 4 are cross sectional views showing a forming model, using reinforcing fibers, FIG. 5(a) and FIG. 5(b) are enlarged cross sectioanl views showing outlined structures of the model of the invention, FIG. 6 is a cross sectional view showing an embodiment applied to a cast FIG. 7 is a perspective view of a lower part of the cast of FIG. 6, FIG. 8 is a perspective view showing application of the invention to a vacuum forming die, FIG. 9 is a cross sectional view of the above, FIG. 10 is a cross sectional view showing application of the invention to a water absorption molding die of ceramics, FIG. 11 is a cross sectional view showing an embodiment applying the invention to a blow molding, FIG. 12 is a cross sectional view showing an embodiment applying the invention to a plastic flowing mold, FIG. 13 to FIG. 15(a) and FIG. 15(b) are cross sectional views showing manufacturing process of a forming model by the invention, FIG. 16 is a cross sectional view showing an embodiment applying the invention to pouring-absorbing form for molten material under non pressure, FIG. 17 is a cross sectional view showing one example of an apparatus to be used in FIG. 16, FIG. 18 is a side view, partially in section, showing an embodiment applying the invention to pouring-absorbing form for molten material under low pressure, FIG. 19 is a cross sectional view showing an embodiment applying the invention to absorbing form under pressure in accompaniment with plastic flow, FIG. 20 is a cross sectional view showing an embodiment applying the invention to a vacuum forming die, FIG. 21(a) to FIG. 21(d) are cross sectional views showing an embodiment applying the invention to blow molding, FIG. 22(a) and FIG. 22(b) are cross sectional views showing an embodiment applying the invention to slip casting, FIG. 23 is a graph showing the relation between compression strength and sintering time of a forming model using ferrous powders as metallic powders, FIG. 24 is a graph showing the relation between compression strength and sintering time of a forming model using non ferrous powders as metallic powders, FIG. 25 is a graph showing the relation between compression strength and sintering temperature of products using ferrous powders as metallic powders, FIG. 26 is a graph showing the relation between compression strength and sintering temperature of products using non ferrous powders as metallic powders, FIG. 27 is a graph showing the relation between sintering time and increase of weight of a product, FIG. 28 is a graph showing bending strength of products where reinforcing fibers were added to ferrous powders, FIG. 29 is a graph showing bending strength of products where reinforcing fibers were added to non ferrous powders, FIG. 30 is a graph showing the relation between the amount of added fibers and the amount of change in sizes of products where reinforcing fibers were added to ferrous powders, FIG. 31 is a graph showing the relation between the amount of fibers fibers and amount of change in sizes of products where reinforcing fibers were added to non ferrous powders, FIG. 32 is a graph showing the relation between porosity and mixing ratio (binder:aggregate), FIG. 33 is a graph showing the relation between mixing ratio of aggregate and compression strength, FIG. 34 is a graph showing the relation between sintering time and porosity and thickness of hardened layer using ferrous powders, FIG. 35 is a graph showing the relation between sintering time and porosity and thickness of hardened layer using non ferrous powders.

FIG. 36 is a graph showing translation of forming models using ferrous powders, and FIG. 37 is a graph showing translation of forming models using non ferrous powders.

DETAILED DESCRIPTION OF THE INVENTION

Figure 32:
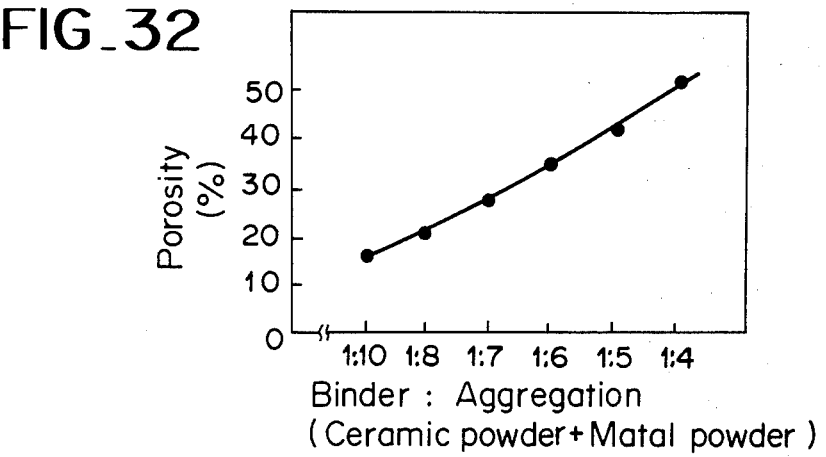

FIGS. 1 and 2 show basic structures of a permeable and durable model according to the invention, which is composed of a composite sintered body 1 where metallic powders and ceramic powders are aggregates. The body 1 has a fine hardened layer 2 on an outer shell including at least a model surface 11. The hardened layer 2 goes to a center part of the model as shown in FIG. 2, so that the entire body may be composed of the hardened layer, or the hardened layer 2 does not go to the center part as shown in FIG. 1, so that a backing layer 3 may be formed which is composed of a non sintered mixture of the metallic powders and the ceramic powders at the inner side of the hardened layer.

FIGS. 3 and 4 show another embodiment of the permeable and durable model according to the invention, which is composed of the composite sintered body 1 where the metallic powders, the ceramic powders and reinforcing fibers 4 are aggregates.

The composite sintered body 1 shown in FIG. 3 has, similarly as in FIG. 1, the backing layer 3 composed of the hardened layer 2 whose outer side is close, and the non sintered mixture at the inner side of the layer 2, in which the reinforcing fibers are almost uniformly scattered in the hardened layer 2, the backing layer 3 and in boundary between them, and the scattered fibers 4 strengthen the structure of the non sintered mixture composing the backing layer 3, and bridge between said two layers 2 and 3, thereby to increasing adhesion of these layers.

In the embodiment shown in FIG. 4, the entire model is composed of the hardened layer 2, and the reinforcing fibers 4 are scattered throughout the body.

The hardened layer 2 comprises a joined structure of dispersed granular oxides 20 of the metallic powders and the ceramic powders 21 as shown in FIG. 5(a). Generated mechanism of the hardened layer 2 is not always apparent, but it is considered that in general the metallic powders are oxidized to increase cube and sintered as those wrap the ceramic powders, while on the other hand, sintering of the ceramic powders advances, and joint such as diffusion conjunction takes place at interface with the ceramic powders. The hardened layer 2 has on its surface and in its inner side fine (0.1 to 50 μm but in average 5 to 20 μm) and countless open bores 22 which are formed in that substances in the sintered materials get out via the sintered surface from its inner part. By the fine open bores 22, the close and smooth surface is formed notwithstanding porosity.

The backing layer 3 in the inner side of the hardened layer 2 comprises a mixture of the metallic powder 20' not sintered and the ceramic powders 21' as shown in FIG. 5(b). In the interfaces of the metallic powders 20', 20', rough open bores 22' are formed together with disappearing of the binder. The bore 22' communicates with the open bore 22 of the hardened layer 2, so that the composite sintered body 1 has the porous permeable structure. The both bores 22 and 22' are characterized in that they are not cracks. The porosity depends upon later mentioned mixing conditions, sintering conditions and others, but in general is between 5 and 60%, and the composite sintered body has the compression strength of about 100 to 900 Kg/cm$^2$ or more.

Herein, for "metallic powders", ferrous metallic powders, non ferrous metallic powders, their mixture or alloyed powders are used.

Ferrous metallic powders are iron powder or steel powders of cast iron powder, electrolytic powder or pure iron powder. The cast iron powder has the merit of accelerating formation of open bores by combustion of free carbon when sintering. For the cast iron powders, gray cast iron, ductile cast iron or alloyed cast iron may be used, and alloyed cast iron improves the heat resistance and corrosion resistance.

Non ferrous metallic powders are almost all of Ni, Cr, Mn, Mo, Ti, Cu, Co and W powders. They may be used separately or in a mixture of more than two, alloyed powders or composite powders. If necessary, Zn, Sn or Pb powders may be employed, but they lower characteristics of strength and heat resistannce.

Since the ferrous metallic powders are cheap, they are often used, but the chemical stability of oxides is poor, and therefore if very little ferrous rusts are not allowed, non ferrous metallic powders should be used. If non ferrous metallic powders are appropriately selected, the strength is heightened, the heat resistance and corrosion resistance are increased, and sizing precision or surface property are improved. Colour phase is pretty and the product value is heightened. For example, if high strength is required in the product, Cr powder is suitable. If the heat resistance and corrosion resistance are required, Cr, Ni and Mo powders are effective.

For "ceramic powder", such substances which are low in deformation at high temperature and easy to join to the metallic powders are selected. For example, they are neutral substances which are represented by mullite, sintered alumina, active alumina, fused cast alumina, chromite or silimite, or acidic substances which are represented by fused silica, zirconia or fused zircon. They are in general suitable, but basic sustances may be used which are represented by magnesia. When the binder is such as silica sol, and since it is stable in pH 2 to 4, the neutral or acidic heat resistance powder is suitable.

For "reinforcing fibers", steel materials are proper. Especially, stainless steel fibers are not corroded during the sintered process, since its reinforcing effect is high against the hardened layer and the backing layer. The reinforcing effect is obtained by other reinforcing fibers, for example, ordinary steel fibers such as free cutting steel, glass fiber, ceramic fiber as alumina fiber, and carbon fibers. They serve the prevention of cracks and the dropping ceramic powders. The glass fiber is satisfactory in adhesion with the binder, and useful when ferrous oxides are extremely prohibited.

It is preferable that diameter of the metallic powder not sintered is 2 to 500 $\mu$m at the maximum, and that of the ceramic powder is 10 to 300 $\mu$m. Ferrous powder, especially cast iron powder is appropriate in 50 to 500 $\mu$m. The reason for determining the lower limit is that the smaller the diameter is, the more preferable the powder is in view of the translation and surface roughness of the model, but such conditions easily invite cracks. The reason for determining the upper limit is that the property of the model is deteriorated by excessive porosities, and the strength. Thus the diameter is appropriately selected between the upper and lower limits in accordance with usage of the forming model and using conditions (the surface roughness etc.).

The reinforcing fibers are selected between 0.05 and 30 mm in length and 5 and 400 $\mu$m in thickness (conversion into diameter). The stainless steel fibers or steel fibers are preferable in products directly obtained from blocks by self-vibration machining, but may depend upon other methods.

When adding the reinforcing fibers, the amount is changed by the properties or sizes, but about 1 to 20 vol%. If less than 1 vol%, the effects of strength and stability of size could not be expected. If more than 20vol%, fiber balls are easily formed, irrespectively of the fiber properties, and forming ability is lowered. Further, the precipitation to the surface of the hardened surface is excessive, and such addition is disadvantageous in cost. If the asbesto ratio of the stainless steel is large, the upper limit is 10vol%. If the asbestos ratio is small, for example, the glass fiber is 0.03 mm in thickness and 0.1 mm in length, addition may be allowed up to about 20vol%.

FIGS. 6 and 12 show embodiments of the invention. FIGS. 6 and 7 apply the invention to the absorption casting model where the molten material is poured under non-pressure or pressure and negative pressure is served within the cavity until solidification. The model is divided into one model 10a and the other model 10b, and the two are composed of composite sintered products where the aggregate is the metallic powders and ceramic powders.

In this embodiment, the composite sintered body is formed with the sintered and close hardened layer 2 on the outer surface, while the backing layer 3 of non-sintered mixture is formed on an inner side of the layer 2, and both models 10a, 10b are defined with cavities 12 by means of model faces 11, 11. The model faces 11, 11 and a passage 13 are structured within the hardened layer, and pin holes 14 for taking out the products pass through the hardened layer 2 and the backing layer 3. Conduits or heaters 15 are buried in the layers 2 and 3 for cooling or keeping the model warm as required.

FIGS. 8 and 9 show an embodiment applying the invention to a vacuum forming die which is widely used for plastic sheet. A die 10 is composed of a composite sintered body where the aggregate is composed of the metallic powders and the ceramic powders. The composite sintered body is formed with close hardened layer 2 on an outer shell, and in the inner part of the hardened layer 2 the backing layer 3 is formed which is composed of non sintered mixture powders. The hardened layer 2 is defined with a 1st model face 11a having a leather embossing pattern and a 2nd model face 11b of relief pattern, and these two faces make an absorption model. The model face is not limited to this embodiment but optional, and may be defined on either the male or female dies.

FIG. 10 shows an embodiment applying the invention to an absorption model of slurry material, for example, a slip casting model of earthenware or porcelain, which comprises two models 10a, 10b having model faces 11, 11 forming the cavity. Both models 10a, 10b are composed of the composite sintered body of the metallic powders and ceramic powders, and have the hardened layer 2 on the outer shell including at least the model face. The model 10b is defined with a passage 16 communicating with the model 11 and a vent 17 larger than the passage 16, and is provided with a conduit for feeding the slip to the vent 17.

FIG. 11 shows an embodiment applying the invention to a model which expells the air within the cavity when forming as represented by a blow forming mold of the plastic film or sheet, which is composed of two divided models 10a, 10b defined with model faces 11, 11 to imprint shapes or patterns on the plastic sheet or film of bag shape. The mold of this embodiment is made of the metallic powders, ceramic powders and composite sintered body, and the shown one comprises the hardened layer 2.

FIG. 12 shows an embodiment applying the invention to a die which subjects a softened or semi-molten lump material to pressure in order to cause plastic flow into a determined shape and act absorption force thereon concurrently. The die of this embodiment is composed of the two divided models 10a, 10b which are formed with model faces 11, 11 to provide a cavity 12 of determined size. The present embodiment has the backing layer 3 as the inner layer of the hardened layer 2 of the outer shell, and the reinforcing fibers are dispersed in the hardened layer 2 and the backing layer 3.

In FIGS. 6 and 12, since the model is permeable as a whole, absorbing portions may be desired positions. For example, in the embodiment shown in FIG. 11, the circumference of the models 10a, 10b except the model face is protected with a cover or box 180 having vents 181, so that the whole body is made absorbing part 18. As seen in FIGS. 6 and 12, the absorbing parts 18, 18 may be provided at one or a plurality of positions of the models 10a, 10b. In such a case, filling means 19 such as filling paint, air-tight material or casing may be applied to the outer surface except the absorbing parts. FIGS. 6 to 12 of course illustrate examples of this invention to which the structure shown in FIGS. 1 to 4 can be applied where the whole body of the model is the hardened layer 2 and the reinforcing fibers 4 are dispersed. In the above mentioned embodiemnts, both divided models 10a, 10b are composed of the composite sintered maerial, and are permeable, but such preparations may be made to either one.

The permeable and durable models shown in FIGS. 1 to 12 may be produced via a step of mixing and kneading the aggregates and binder to make a slurry material, a step of pouring the slurry and molding it into a desired shape, a step of drying the shaped body, and a step of sintering the dried body in the oxidizing atmosphere.

The step for making the slurry comprises fully mixing and agitating the metallic powders and the ceramic powder, and the reinforcing fibers which have been selected in accordance with using aims, and adding the binder containing substance which will evaporate or consume after having been formed.

Herein, "binder containing evaporating or consuming substance" refers to such substance where the metallic grains and ceramic grains are joined, and which is used to form fine air holes.

A typical binder containing the evaporating substances is silicon compound, especially silica sol (colloidal silica): $SiO_2 \cdot nH_2O$. Silica sol is a stabilized colloid solution of silica. For example, $SiO_2$ of 20 to 21% density, $Na_2O$ of less than 0.02% density, pH 3 to 4, viscosity (20° C.) of less than 3 cP, specific gravity (20° C.) of 1.10 to 1.16. In this case, evaporation of the water forms porosity.

Especially suitable binder in the invention is organic silicate binder, especially alcholic solvent silica sol based on ethyl silicate. Ethyl silicate is a compound of low condensate of ethyl ortho silicate, and oil solution where main content is about 4 to 6 volume, 40 to 42% available silica, specific gravity (25° C.) of 1.04 to 1.07 and viscosity (25° C.) of 2.6 to 4.2 cps. Sole ethyl silicate is stable substance without binding property. The binding property is effected by mixing alcohol solvent and water in ethyl silicate and electrolyzing the mixture. Alchol solvent is mainly ethanol or isopropanol, and acidic substance (hydrochloric acid, phosphoric acid, oxalic acid) is added as a catalyst for acceleration of reaction and stabilization of silica sol. The mixture is ethyl silicate of 80 wt part, alchol solvent of 13 wt part, water of 6 wt part, and catalyst of 1 wt part. Silica sol of 20% silica density is obtained by ethyl silicate of 50 wt part, alchol solvent of 43 wt part, water of 6 wt part and catalyst of 1 wt part. Silica density of 21 to 31% is obtained by regulating ethyl silicate of 55 to 75 wt part, alchol solvent of 15 to 33 wt part and water of 7 to 11 wt part. Obtained silica sol of alchol solvent is a colorless and transparent liquid of 23 to 25% non evaporating substance (110° C.), specific gravity (25° C.) of 0.92 to 0.93 and viscosity of more than 4 cps.

For the binder containing the consuming substance, those resins may be used which are hardened at room temperatures such as urethan resin, polyester resin, epoxy resin, and preferably those which are changed into low viscosity by the solvent. To other binders known material represented by water glass may be added in appropriate amount.

The mixing ratio of the metallic grains, ceramic grains and binder is preferably (1 to 5):(1 to 5):1 in weight ratio, and the most recommended is 2:2:1 to 5:5:1. This mixing ratio is determined for obtaining characteristics in balance such as strength, permeability, heat conductivity or surface property. The lower limit of 1:1:1 is set because this extent is necessary to obtain available at least strength as the forming model. The upper limit of 5:5:1 is set because if the aggregates are too much for the binder, a covering power of the binder is decreased so that strength is lowered and inferiority of stability of the model surface is caused. The upper limit of the metallic grains is why if the metallic grains are excessive though the mixture of the ceramic grains and the binder is appropriate, the strength will be unsatisfactory, and the porosity becomes higher unnecessarily, and further the surface property is deteriorated to spoil the translation which is important to the forming model. The upper limit of the ceramic grains is set because the strength is lowered by the excessive addition. The binder is necessary for joining of the aggregates, and also necessary for providing permeability. Excessive addition would make the sintered body much too porous and reduce the strength.

A next reference will be made to a process of forming desired shapes of forming models. This process is undertaken by pouring the mixed substance of slurry prepared in the pre-stage, and solidifying it. For example, the mixed substance 5 is poured into a model frame 7 arranged with a model element 6 such as a design, master model, actually formed product or the like, as shown in FIG. 13, and is left in the air for a determined time. It is effective to add hardening agent for accelerating solidification, give vibration for assisting the filling property or squeeze the substance. The shape or pattern of the model element 6 may be exactly translated by desirable fluidity of the mixed material 5 and selection of the metallic grains and the ceramic grains of proper sizes. If pins or pipes are inserted within the model frame 7 during forming the mixed material, pin holes 14 or the cooling or warming mechanisms 15 shown in FIG. 6, or the absorbing parts 18, 18 shown in FIGS. 6 and 12 are obtained.

Subsequently, the shaped body from the model frame is dried in the air or by fire for preventing occurrence of cracks or strains, as well as evaporating the alchol or water contained in the binder so that permeability (air holes) is provided. In the former air drying, time is selected between 1 and 48 hr in accordance with the size, model and others. The drying is speeded up by the atmosphere at high temperatures or hot blast. The latter fire drying is carried out by subjecting the shaped body to the fire directly to burn the evaporating materials.

The shaped body passing the drying process has permeability as a whole, and may be used as it is as a model of non pressure. However, the mechanical strength is low and the endurance is poor.

The invention charges the shaped material 8 after the drying process into a heating stove 9 as shown in FIG. 14, and sinters it under the oxidizing atmosphere by means of a heating source such as a resistance heater or gas. The oxidizing atmosphere may be air or oxygen enriched air where the oxygen supply is considered. The sintering condition depends upon the metallic powders, mixing ratio, size of the model, destined porosity and others, but in general the sintering temperature should be 400° to 1500° C. and the sintering time should be more than 1 hour. The lower limits of the both are set because the sintering would be unsatisfactory and the close hardened layer would not be produced and necessary strength as the endurance model would not be achieved. The upper limit of the sintering temperature is set at 1500° C. because the hardened layer is formed but the surface is made rough so that the translation property is missed and the sizing precision is damaged. When the metallic powder is ferrous, the upper limit of the sintering temperature is preferably about 1000° C., especially 850° to 950° C. The longer is the sintering time, the more rough is the surface and the productivity is lowered.

By the sintering process in the oxidizing atmosphere, the sintering of the ceramic powders in the shaped body and the sintering in oxidation of the metallic powders progress, and as seen in FIG. 14 the hardened layer 2 grows toward the inner part from the surface of the body 8. At this time, the evaporating or consuming substances residing in the shaped body are burned away so that the body is made porous. When the sintering process is completed, the filling means 19 is provided as in FIG. 15(a) or the cover or box 180 is furnished as in FIG. 15(b), whereby the permeable and durable forming model comprising the composite sintered product is produced as shown in FIGS. 6 to 12.

The permeability (porosity) may be regulated optionally by paying attention to the types of metallic powders and ceramic powders, powder sizes, the mixing ratio between the metallic powder, ceramic powder and binder, the vibrating or squeezing conditions at pouring, the sintering conditions and the strength of the model.

FIG. 32 shows the relation between the mixing weight ratio of the binder and the aggregates (metallic powders+ceramic powders) and the porosity. The data are the cast iron powders as the metallic powders (maximum diameter 100 $\mu$m), compound mullite powders (maximum diameter 100 $\mu$m), the ethyl silicate as the binder and the sintering condition of 900° C.×1 hr. It is seen from FIG. 32 that the porosity is heightened by lowering the mixing ratio of the aggregates. This fact may be applied to an experiment using non ferrous metallic powders as the metallic powders.

Figure 33:
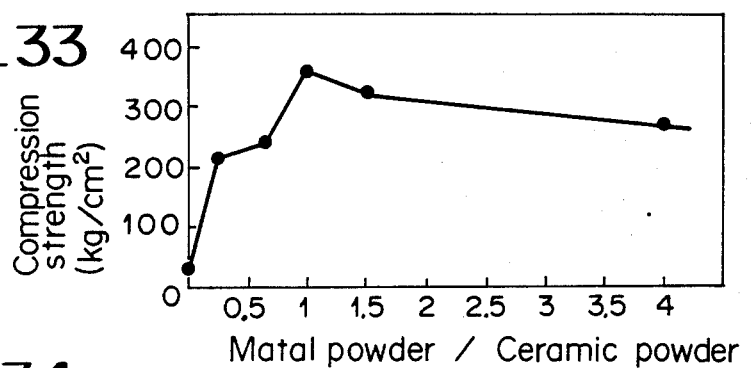

FIG. 33 shows how the compression strength is influenced if the mixing weight ratio between the metallic powders and ceramic powder is changed while the mixing weight ratio between the binder and the aggregates is constant (1:5). The test pieces are 10 mm$\phi$×20 mm, the material and the sintering conditions are the same as in FIG. 32, and the metallic powders:the ceramic powders are prepared in six kinds of 4:1, 3:2, 2.5:2.5, 2:3, 1:4, and 0:5. It is seen from FIG. 33 that the strength of more than 100 Kg/cm$^2$ is obtained with respect to others than 0:5, and especially the equal mixture of the metallic powders and the ceramic powders brings about the most desirable strength. Others than 0:5 are all 35 to 50% in porosity, and the porosity is increased by increasing the metallic powders.

The products produced by the invention and services thereof will be referred to next.

FIGS. 16 to 22 show the using conditions of the permeable and durable forming model. FIGS. 16 and 17 show the embodiment applying to the absorption forming cast under non pressure of molten metals as aluminium alloy, cupper or iron, the liquid or slurry maerial W as mortar, wax or refractory.

In this practice, one model 10a is stationary and the other 10b is movable, and a medium such as model separating agent or the like is coated on the model faces 11, 11 into which the material W is poured. In this invention, the stationary model 10a and the movable model 10b are in advance provided with absorbing parts 18, 18 to communicate with a reduction pressure device 23 such as a vacuum pump via a hose so that the absorption is served from pouring of the material W.

A forming apparatus incorporating the forming model is optional, and one example is shown in FIG. 17. In this apparatus, a frame 24 is provided with stationary beds 32a, 32b, and one bed 32a is provided with a model 10a by a frame body 33. The frame 24 is secured with guide rods 34, 34 at both sides thereof. THe guide rods 34, 34 are inserted with two attaching plates 35a, 35b at their end parts, and the both attaching plates 35a, 35b are connected by spacers 25 such as roller bearings. One attaching plate 35a facing the stationary bed 32a is attached to another model 10b via the frame body 33.

The other attaching plate 35b is connected at its rear side with a piston rod 27 of a cylinder 26 for opening the model and equipped on the frame 24. The attaching plate 35b is provided with a movable plate 28 at its front side, which is fixed with ends of pushing pins 29, 29 corresponding to pin holes 14, 14 of the model 10b at the movable side. Around the pins 29, 29, springs 30, 30 are positioned to push the movable plate 28 to the attaching plate 35b. The movable plate 28 is implanted at its rear side with pins 31, 31 projecting through the attaching plate 35b.

According to this structure, when the cylinder 26 is served to open the model from the casting condition, the pins 31, 31 contact a front plate 320 of the stationary bed 32a, so that the movable plate 28 is moved to the front side of the plate 35, and the pins 29, 29 are moved in the axial direction to separate the product from the model face. It is possible to set exact releasing time from the model and smoothly separate the product from the model without subjecting it to partial loads.

FIG. 18 shows an embodiment applying the model of the invention to the absorption system of low pressure of the liquid or slurry material W represented by the molten metal.

In this case, the models 10a and 10b as shown in FIG. 6 are used in place of the metal model in the known casting apparatus of reduction pressure, and absorbing parts 18, 18 are positioned at desired parts of the stationary model 10a and the movable model 10b. The absorbing parts 18, 18 are, as seen in FIG. 16, connected to the reduction pressure device 23, and the piston rod 27 of the model opening cylinder 26 is connected to the movable model 10b. Of course, the models 10a, 10b may be supported by the frame body.

In undertaking the forming, the material W is charged in a crucible 35 and is molten in a stove 36, and the gas is introduced under pressure into the crucible 35 via gas passage 370, so that the molten material is raised up into the cavity 12 of the models 10a and 10b via a conduit 38, while the absorption power is activated through the absorbing parts 18, 18 by means of the reduction pressure device 23.

FIG. 19 shows an embodiment where the model shown in FIG. 12 is used, and pressure and absorption are performed on the semihardened or soften material W' to creat plastic flow, and the forming is practiced.

In this case, the existing male model comprising the metal is substituted with the forming models 10a, 10b of composite sintered body according to the invention, and for example, the stationary model 10a corresponding to the female model is fixed to the side of the press bed, and the movable model 10b corresponding to the male model is provided to the side of the press slide, and the absorbing parts 18, 18 are positioned at the desired parts of the models 10a, 10b and communicated with the pressure reducing device (not shown). In undertaking the forming, the material W' is charged in the model face of the stationary model 10a, and the movable model 10b is actuated to carry out the absorption, while necessary pressure is subjected to the material W'.

FIG. 20 shows an embodiment applying the forming model of the invention to the vacuum forming die of the plastic sheet. It is no longer necessary to form the absorbing vents. The model 10 as seen in FIGS. 8 and 9 is provided within a frame 39 of a vacuum forming machine 39, and the plastic sheet W softened by heating is expanded over the model frame 39, and the pressure reduction is actuated on desired parts of the model opposite to the model face.

FIGS. 21(a) to 21(d) show an embodiment applying the invention to the blow molding model of the plastic. In FIG. 21(a), the two models are composed of the movable models 10a, 10b. The forming material (parison) is in advance heated and softened, and is inserted into the movable models 10a, 10b under the condition that a first expansion is given by the air blowing pipe 41 of the device 40. Subsequently, the material W is squeezed as shown in FIG. 21(b). The air is injected into the material W by an air blowing pipe 41, so that the material is expanded and the air is exhausted to the outside through the hardened layer 2 and the backing layer if the latter is formed. The material W is adhered to the model faces 11, 11. The dice is removed as shown in FIG. 21(d) and the material W is cooled by maintaining it for a certain period of time, and turns out a product W'. In the above process, the absorbing power may be acted externally during squeezing as shown in FIG. 21(b).

FIGS. 22(a) and 22(b) show an embodiment which uses the model according to the invention as a slip casting model into which the slurry material (slip) W is poured under pressure and the water is exhausted therefrom.

The model is divided into the stationary model 10a and the movable model 10b, and the cavity 12 is constructed with these models and the slurry material W is poured under determined pressure via a supply passage 42 and a path 16. By this pressure the air within the cavity 12 is exhausted to the outside through the air holes of the composite sintered product, and the water contained in the slurry W. The movable model 10b is opened after a certain time to take out a product W'. Before or at the same time with pouring the slurry material W, the absorbing power is actuated from the outside as in FIG. 21(b).

In the above processes, the forming models 10, 10a, 10b comprise the composite sintered models where the aggregates are the metallic powders and the ceramic powders. Since the outer circumference including the model face 11 is formed with the hardened layer 2 where the metallic powders are oxidized, the strength is more than 100 Kg/cm$^3$ and has the necessary conditions such as wear resistance and heat resistance.

Therefore, cracks are not created by repetitions of rapid heating, rapid cooling or squeezing by means of the model, and further the model is not cracked at corners. Especially, if the reinforcing fibers are added, the bending strength is increased and sizing error is little.

Thus, the forming model by the invention is higher in endurance than foregoing plaster models or resin models. If the model is produced with the composite sintered body where the metallic powders and non ferrous metallic powders are used, the corrosion resistance of the metallic oxides is excellent with the chemical stabilization so that rust prevention is not necessary. Therefore, if it is used, for example, as the slip casting model, the using cycles can be increased rapidly.

In addition to the excellent characteristics as the endurance model, the hardened layer 2 and the backing layer 3 are composed of porous material including fine air holes 22, 22'. The air passing positions are not limited as the metal model and the entire body is of satisfactory permeability, that is, the whole surface of the model face 11 has absorbing holes.

The hardened layer 2 forming the model face 11 has the absorbing holes, but since they are very fine in size, the surface is close and little in roughness. The product is made by pouring the material (translation property is well for the surface elements), and in addition, the model face per se has good translation property for the material W.

By carrying out the absorption from proper positions, or pressure from the interior of the model as shown in FIGS. 21 and 22, the absorption can be actuated over the cavity and model face so that the material can be filled or adhered to detailed parts. The air within the cavity and the water in the material are expelled concurrently.

The models of the invention are low in the heat conductivity in comparison with the metal model, and if those are used to the casting of the molten material, fluidity is smooth though the speed is low and the pressure is low. For these conditions it is easy to form products of complicated shapes or small thickness without pin holes or other defects in the surface and inner part.

If the present model is used to the vacuum forming model, the absorption is actuated uniformly over the model face, and the plastic sheet heated at determined temperatures is satisfactorily adhered to the model face 11, and foregoing problems about the prior art can be perfectly removed which are flow of the surface squeezing, unevenness in thickness or wrinkles at corners. Especially, the absorbing holes are groups of fine air holes, and so the absorbing holes remain in the thin sheet, and since the holes are countless, the leather embossing patterns can be exactly represented.

Actual embodiments of the invention will be next referred to.

EXAMPLE 1

I. Ferrous powders were used as the metallic powders, and test permeable and durable forming models were made for tests under the condition as shown in Table 1. In this Example, the mixing weight ratio of the metallic powders and ceramic powders were equal.

and cracks are created, and the permeability could not satisfy 10%.

IV. With respect to Sample B, the sintering time was 6 hr, and the bending test was made on the product. The results are shown in FIG. 28 and the test of changes in size are shown in FIG. 30. It is seen from FIGS. 28 and 30 that if the reinforcing fibers are added, the bending strength is remarkably increased, and changes in size of the model is controlled. Therefore it is suitable to the forming model of large size.

In Samples A to E, the influences by the rapid heating

TABLE 1

| Samples | Metallic grains (1) Materials | Grain dia. (μm) | Ceramic grains (2) Materials | Grain dia. (μm) | Binders (3) Materials | Mixing wt ratio (1):(2):(3) | Reinforcing fibers Materials | Size L × D | Addition (vol %) |
|---|---|---|---|---|---|---|---|---|---|
| A | Cast iron | <100 | Composite mullite | <100 | Ethyl silicate | 3:3:1 | — | — | — |
| B | " | " | Composite mullite | " | Ethyl silicate | 3:3:1 | Stainless steel | 7 mm × 0.19 mm | 1 to 4 |
| C | Pure iron | " | Composite mullite | " | Ethyl silicate | 4:4:1 | — | — | — |
| D | Cast iron | " | Composite mullite | " | Ethyl silicate | 2:2:1 | — | — | — |
| E | " | " | Composite mullite | " | Ethyl silicate | 2:2:1 | Stainless steel | 7 mm × 0.19 mm | 1 to 4 |
| F | " | " | Composite mullite | " | Ethyl silicate | 0.9:0.9:1 | — | — | — |
| G | " | " | Composite mullite | " | Ethyl silicate | 5.5:5.5:1 | — | — | — |
| H | " | 540 | Composite mullite | 320 | Ethyl silicate | 3:3:1 | — | — | — |
| I | " | <45 | Composite mullite | <45 | Ethyl silicate | 3:3:1 | — | — | — |

Note 1: Ethyl silicate is alcohol soluble silica sol of $SiO_2$ of 20% density and volatile matter of 80%
Note 2: Cast iron was ordinary cast iron of FC20 grade (3.0% C, 2.53% S, 0.43% Mn, 0.09% P, 0.05% S), and grains were obtained by crashing with hammer mill
Note 3: Stainless steel was obtained with self-vibration machining, and triangle in cross section. "D" was conversion value of the diameter.
Note 4: Grain sizes were the maximum except H. H is average diameter.

II. Said material was uniformly agitated to make the slurry test material. This slurry was poured into the model frame arranged with the pattern. After removing the products from the model, Samples A, B, C, F and G were dried by subjecting to the fire for 0.5 hr, and Samples D, E, H and I were dried in the air for 48 hr.

Each of Samples was charged into the electric furnace of resistance heating, and sintered in the air atmosphere. Endurance models with permeability comprising the composite sintered products were obtained.

III. The relation between compression strength and sintering time is shown in FIG. 23, and the relation between compression strength and sintering temperatures is shown in FIG. 25. The relation between sintering time and changes in weight of the sintered articles is shown in FIG. 27.

The compression strength and weight increase as the sintering time advances and the sintering temperatures become higher. This is why the ferrous powders are oxidized, and the hardened layer is generated.

Samples F to I are comparative examples. In Sample F, the slurry material is low in viscosity, and the molding is easy, but since the binder is excessive, the porosity is too high as 70%, and the strength is below 100 $Kg/cm^2$. In the Sample G, the viscosity is too high, and the translation property is remarkably decreased. The pin holes could not be removed and the product is unsuitable. The grain size of Sample H is too large, so that the strength is less than 100 $Kg/cm^2$, and strain after sintering is large. The grain size of Sample I is too fine, and cooling were confirmed by repeating the heating at 800° C. for 5 minutes and the cooling to room temperature for 5 minutes. As a result, cracks and defects were not found.

Figure 34:
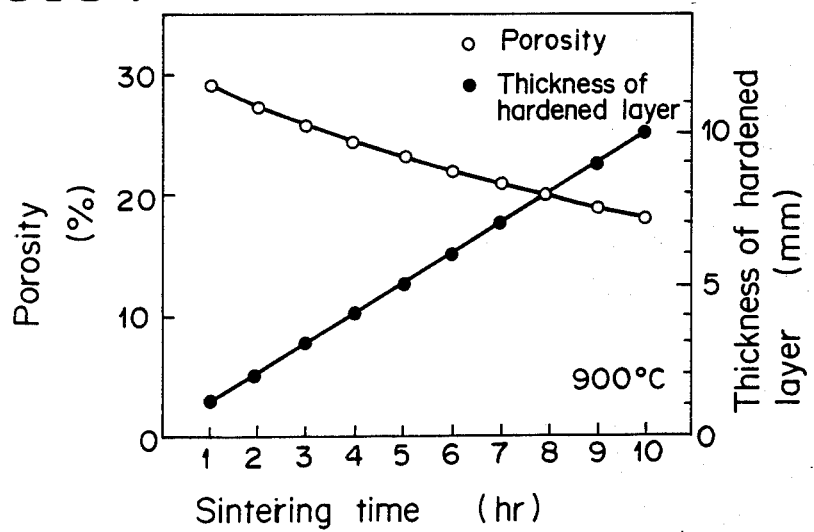

V. In Samples A and B, the relation between the sintering time (max. 10 hr), thickness of the hardened layer and the porosity was investigated under the condition of the constant sintering temperature (900° C.). The results are shown in FIG. 34. The hardened layer becomes thicker and the porosity becomes lower as the sintering time goes on. From this fact, it is seen that the porosity may be also controlled by the sintering time.

VI. Sample A of Table 1 was used, and the casting model of a part of the automobile (shift fork) was obtained with sizes of L200×w300×t50 mm under the conditions of the porosity of 20%, compression strength of 850 $Kg/cm^2$, thickness of the hardened layer of 6 to 8 mm. In accordance with JIS B0659, the translation was undertaken with the model of 3.2S, and the data of 3.2 to 6.3S were obtained. From this fact, it is seen that the model by the invention has the permeability and the close model face. With respect to Samples B to E, the results were almost equal.

The model face was washed with graphite alcohol solution, and the model was provided with absorbing pipes at the side, and the other part was applied with the filler of sealing or coating, and the model was incorporated into the casting device as shown in FIG. 17. The casting was operated under gravity of aluminium alloy ADC-12, while the absorption of 700 mmHg was operated via the absorbing pipe. The casting conditions were the casting temperature of 700° C., the casting time of 3 to 5 sec. and time of seperating from the model of 15 to 50 sec. Consequently, the molten material flowed smoothly without sinking, and the translation property was remarkably improved in comparison with the sample gravity casting. The product was close in the inner part.

The casting of 1.5 mm in thickness was performed. The molten material went to detailed parts, and the cast product of thin thickness without defects was obtained. With respect to the endurance, the model was not generated with defects after 70 times of use.

VII. Sample B of Table 1 was used under the conditions of the porosity of 25%, compression strength of 900 Kg/cm² and thickness of the hardened layer of 5 to 7 mm, and the sintering time of 5 hr. The same model as VI was obtained.

This model was used, and the casting of Al alloy (ADC-12) was carried out by the low pressure casting of FIG. 18, and the absorbing power of 700 mmHg was actuated through the pipes of the sides of the movable and stationary models under the conditions of the liquid temperature of 700° C., pressure of 1.5 Kg/cm², casting time of 1 sec, and time of separating from the model of 15 to 50 sec. As a result, the precision was improved up to the level of the die casting, in addition to the characteristic of the low pressure casting.

VIII. Sample C was used, and the vacuum forming model with the face of the leather embossing pattern was produced under the contions of 900° C. ×2 hr, sizes of 120L×120w×30t (mm), the porosity of 25%, and the thickness of the hardened layer of 3 mm.

The forming model was incorporated into the forming machine as illustrated in FIG. 20, and the plastic sheet of ABS (material) and thickness of 0.5 mm was subjected to the vacuum forming at the temperature of 90° C. The absorbing part was one at the center of the vacuum forming model, and the aborbing power was 700 mmHg.

The surface roughness by translating the leather pattern and the surface roughness of the plastic sheet by translation under absorption were compared with the master model, and shown in FIG. 36. Difference in roughness between these three is not found, and the excellent translation is provided. This is why the vacuum forming model depends upon the pouring system, and the adherence is close by the sintering, and the hardened layer with permeability was formed, and the uniform absorbing power was acted over the model fance.

The above mentioned translation property is the same when the half molten plastic rubber is applied to the pressure model shown in FIG. 19, in addition without air holes and burrs, since the low pressure is sufficient.

EXAMPLE 2

I. Non ferrous powders were used as the metallic powders, and the permeable and durable forming models were made for tests under the conditions of the best ones from Example 1

TABLE 2

| Samples | Metallic grains (1) | | Ceramic grains (2) | | Binder (3) Material | Mixing wt ratio (1):(2):(3) | Reinforcing fibers | | |
|---|---|---|---|---|---|---|---|---|---|
| | Materials | Grain dia. (μm) (under) | Materials | Grain dia. (μm) (under) | | | Materials | Size L × D | Addition (vol %) |
| J | Carbonyl nickel | 5 | Composite mullite | 100 | Ethyl silicate | 4:4:1 | — | — | — |
| K | Carbonyl nickel | 5 | Zircom | 100 | Ethyl silicate | 4:4:1 | — | — | — |
| L | Carbonyl nickel | 5 | Composite mullite | 100 | Ethyl silicate | 4:4:1 | Glass | 0.5 mm × 13 μm | 1 to 4 |
| M | Chrom | 20 | Alumina | 50 | Ethyl silicate | 5:5:1 | — | — | — |
| N | Molybden | 10 | silica | 100 | Ethyl silicate | 2.5:2.5:1 | — | — | — |
| O | Manganese | 20 | Composite mullite | 100 | Ethyl silicate | 4:4:1 | — | — | — |
| P | Cupper | 15 | Silica | 150 | Colloidal silica | 3.3:3.3:1 | Stainless steel | 3.0 mm × 60 μm | 1 to 4 |

Note 1: Ethyl silicate is alcohol soluble silica sol of SiO₂ of 20% density and volatile matter of 80%
Note 2: Colloidal silica is SiO₂ of 21% density Samples J to P were uniformly agitated to make the slurry materials, and the slurry materials were poured into the frames arranged with master models (foreign dishes, vessels, sanitation fixtures, parts of sewing machines). The products were the forming models of 400×400×200 mm. After removing the solidified models from the frames, Samples J to L were dried by the hot air for 3 hr, and Samples M to P were dried by directly subjecting to fire. The sinterings were performed between 900° C. and 1500° C. in dependence upon the air conditions.

II. With respect to the permeable models J, M, N, O, the relations between the sintering time and the compression strength under the constant sintering temperature (1100° C.) are shown in FIG. 24. With respect to the permeable models J and K, the relations between the compression strength and the sintering temperature under the fixed sintering time (6 hr) are shown in FIG. 26.

From these data, it is seen that the permeable model by the invention is high in the compression strength, and the strength is increased as the sintering time advances and the sintering temperature becomes higher. With respect to the permeable models L and P, the relation between the sintering temperature and the bending strength under the fixed sintering time (6 hr) are shown in FIG. 29, and the relation between the amount of added fibers and changes of sizes is shown in FIG. 31. From these data it is seen that the bending strength is remarkably increased by adding the reinforcing fibers, and the change in sizes is controlled more than using of the ferrous grains.

It is also seen that the sizing precision is satisfactory when the reinforcing fibers are not added, and is rather excellent in comparison with about 1.6% when manufacturing with the ferrous powders under the same conditions.

III. With respect to the permeable models J to P, the relations between the sintering time, thickness of the hardened layer and porosity (observed) under the constant sintering temperatures (1000° C.) are shown in FIG. 35.

In this invention, the permeability is more satisfactory than the case of the ferrous grains in FIG. 34, and the model has the permeablity of more than 20%. When the model is small sized, the hardened layer goes to the center, and the permeability is at least 20%.

IV. The permeable model L of 35% porosity was used, and the endurance tests were made on the slip castings of the dinner ware shown in FIGS. 22a and 22b.

The slip was the mixture of carion, cray, quartz, feldspar, ceramics, cerben and lime, and is fed under the pressure of 10 Kg/cm$^2$ into the conduit so that products of 10 to 12 mm were obtained in adhering time of 10 min.

As a result, the porous models by the invention maintained exact shapes after uses of 20,000 cycles, and the same endurance was provided when the casting was carried out under reduction pressure by acting the absorbing power of 700 mmHg, and the casting was performed under reduction pressure—pressure by acting the same absorbing power. The products were very close.

In the conventional gypsum models, the using limit is 300 times at best notwithstanding mere natural water absorption. If the absorbing power is used, the upper limit is about 80 times. Therefore, the present invention has increased durability. This is why the product by the invention has the high mechanical strength in spite of permeability, well conditioned wear resistance and is not influenced by thermal changes of rapid cooling and heating.

V. The permeable product M of 38% porosity was used, and the blow forming was performed of the plastics (head rest of the automobile). The material was vinyl chloride of parison thickness of 2.5 mm, and the blowing pressure was 3 Kg/cm$^2$. After having squeezed the frame, the absorbing power of 700 mmHg was actuated.

FIG. 37 shows the products and the surface roughness, from which it is seen that excellent translation properties were effected. Because the process depended upon the forming of flowing the material, and the model face had the satisfactory permeablity as a whole. Herein the foregoing problems were solved that the air remained in the cavity, thereby to lower the translation property, and those problem were invloved around the metal models.

The same results were brought about in forming the leather embossing patterns by means of the vacuum forming models of the plastics.

VI. The permeable model N of 35% porosity was used to carry out the casting of pure copper under gravity (thickness 1.3 mm × length 20 mm), and the absorption of 700 mmHg was performed. The casting conditions were the temperature of 950° C., time of 3 to 5 sec and time of separating from the model of 15 to 50 sec. As a result, the product had a pretty surface without sinking or air porosities around the center. Any defects were not found in the models after uses of 150 times.

EXAMPLE 3

I. The forming model was produced where the binder had the consuming substance. The aggregates were cast iron grains of less than 100 μm and composite mullite of 100 μm, ans the reinforcing fibers were stainless steels of a length of 7 mm and a thickness of 0.19 mm. The binder was urethan resin comprising the solution (A) of phenol formaldehyde resin (density of around 50%), the solution (B) of polyisocyanate of aromatic family (density of around 50%) and the basic catalyst. The mixing ratio was cast iron gratins:composite mullite:urethan resin=1.5:1.5:1, and the solution (A):solution (B) in the urethan resin was equal, i.e., 0.5. The reinforcing fibers were added 2 vol%.

II. The forming process was that the solution (A) and the catalyst were mixed, to which the aggregates were added and kneaded and the solution (B) was added thereto and kneaded to make the slurry material. The slurry material was poured into the frame and hardened by leaving in the air for 1 hr. The formed model was inserted at 900° C. for 2 hr under the air condition. The product was 210 Kg/cm$^2$ of compression strength and about 30% of porosity.

What is claimed is:

1. Composite and durable forming model with permeablity, comprising a composite sintered product where aggregates are metallic grains and ceramic grains, said composite sintered product having a close hardened layer which is dispersed with metallic oxides on an outer circumference including at least a model face, and said hardened layer having fine air vents in its thickness by passing of evaporating or consumable substances contained in a binder which is mixed in the aggregates, and wherein an entire body of the model has 5 to 60% porosity and more than 100 Kg/cm$^2$ compression strength.

2. Composite and durable forming model as claimed in claim 1, wherein mixing weight ratio of the metallic grains, ceramic grains and evaporating or consuming substances is (1 to 5):(1 to 5):1 in a slurry for forming determined shapes by passing through drying and heating in oxidizing atmosphere.

3. Composite and durable forming model with permeability, comprising a composite sintered product of metallic grains, ceramic grains and reinforcing fibers, said composite sintered product having a close hardened layer which is dispersed with metallic oxides and the reinforcing fibers on an outer circumference including at least a model face, and said hardened layer having fine air vents in its thickness by passing of evaporating or consumable substances contained in a binder which is mixed in said substance, and wherein an entire body of the model has 5 to 60% porosity and more than 100 Kg/cm$^2$.

4. Composite and durable forming model as claimed in claim 3, wherein mixing weight ratio of the metallic grains, ceramic grains and evaporating or consuming substances is (1 to 5):(1 to 5):1, to which the reinforcing fibers are added 1 to 20 vol% in slurry for forming determined shapes by passing through drying and heating oxidizing atmosphere.

5. Composite and durable forming model as claimed in claim 1 or 3, wherein the metallic grains are ferrous.

6. Composite and durable forming model claimed in claim 1 or 3, wherein the metallic grains are non ferrous.

7. Composite and durable forming model as claimed in claim 1 or 3, wherein the hardened layer does not reach the center of the composite sintered product, and a backing layer comprising non sintered mixture is formed on an inner side of the hardened layer.

8. Composite and durable forming model as claimed in claim 1 or 3, wherein the hardened layer reaches the center of the composite sintered product, and the entire body of the model comprises the hardened layer.

9. Composite and durable forming model as claimed in claim 1 or 3, wherein the composite sintered product is an absorption forming model under non pressure.

10. Composite and durable forming model as claimed in claim 1 or 3, wherein the composite sintered product is an absorption forming model under low pressure.

11. Composite and durable forming model as claimed in claim 1 or 3, wherein the composite sintered product is an absorption forming model under pressure accompanying plastic flowing.

12. Composite and durable forming model as claimed in claim 1 or 3, wherein the composite sintered product is a vacuum forming model of plastics.

13. Composite and durable forming model as claimed in claim 1 or 3, wherein the composite sintered product is a blow forming model of plastic.

14. Composite and durable forming model as claimed in claim 1 or 3, wherein the composite sintered product is a water absorption model of slip casting.

* * * * *